United States Patent [19]

Sudarshan et al.

[11] Patent Number: 5,430,575
[45] Date of Patent: Jul. 4, 1995

[54] IMAGE ROTATION DEVICE

[75] Inventors: George Sudarshan, Austin; Randall G. Hulet, Houston, both of Tex.

[73] Assignee: Quantum Optical Devices, Ltd., Phoenix, Ariz.

[21] Appl. No.: 232,479

[22] Filed: Apr. 25, 1994

Related U.S. Application Data

[63] Continuation-in-part of Ser. No. 65,785, May 3, 1993, Pat. No. 5,331,460, which is a continuation of Ser. No. 772,105, Oct. 7, 1991, abandoned.

[51] Int. Cl.⁶ .................... G02B 3/06; G02B 27/22
[52] U.S. Cl. .................... 359/434; 359/435; 359/503; 359/710
[58] Field of Search ............ 359/434, 435, 503, 710, 359/744

[56] References Cited

U.S. PATENT DOCUMENTS

| | | |
|---|---|---|
| 879,572 | 2/1908 | Neumayer . |
| 1,553,211 | 9/1925 | Barr et al. . |
| 1,828,634 | 10/1931 | Chretien . |
| 1,938,808 | 12/1933 | Ceccarini . |
| 1,962,892 | 6/1934 | Chretien . |
| 1,971,457 | 8/1934 | Maurer . |
| 2,121,567 | 6/1938 | Newcomer . |
| 2,164,827 | 7/1939 | Levim . |
| 2,303,113 | 11/1942 | Eckel . |
| 2,409,708 | 9/1947 | Toda ................ 434/359 |
| 2,720,813 | 10/1955 | Cox . |
| 2,822,727 | 2/1958 | Raitiere . |
| 2,832,262 | 4/1958 | Cook . |
| 2,924,145 | 2/1960 | Landeau . |
| 2,944,464 | 7/1960 | Rosen . |
| 3,359,056 | 12/1967 | Offner . |
| 3,380,335 | 4/1968 | Clave et al. . |
| 3,472,578 | 10/1968 | Price . |
| 3,485,554 | 12/1969 | Hemstreet . |
| 3,759,590 | 9/1973 | Arnaud ............... 434/359 |
| 3,800,085 | 3/1974 | Ambats et al. . |
| 4,043,641 | 8/1977 | Gottlieb . |
| 4,203,652 | 5/1988 | Hanada . |
| 5,331,460 | 7/1994 | Sudarshan et al. ........... 359/434 |

OTHER PUBLICATIONS

E. C. G. Sudarshan, Realization of First Order Optical Systems using Thin Lenses, *Optica Alta*, vol. 32, No. 8, pp. 855-872.

D. W. Swift, Image Rotation Devices—A Comparative Survey *Optics & Laser Technolgy* pp. 175-188.

*Primary Examiner*—Loha Ben
*Assistant Examiner*—Steve Kong
*Attorney, Agent, or Firm*—Jerry M. Keys; Heinz D. Grether

[57] ABSTRACT

An optical rotation device with infinite depth of field for transmitting optical images along an optical axis and selectively rotating the image about the optical axis, while preserving all of the three dimensional characteristics of the image. The optical rotation device consists of two optical elements optically coupled in series, each of which produces an inversion of the image about an axis orthogonal to the optical axis. Rotation of the image by any angle in the plane normal to the optical axis is achieved by rotating the two optical elements relative to one another about the optical axis.

19 Claims, 5 Drawing Sheets

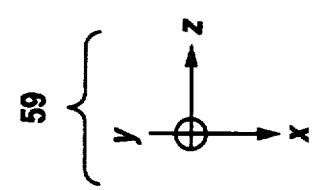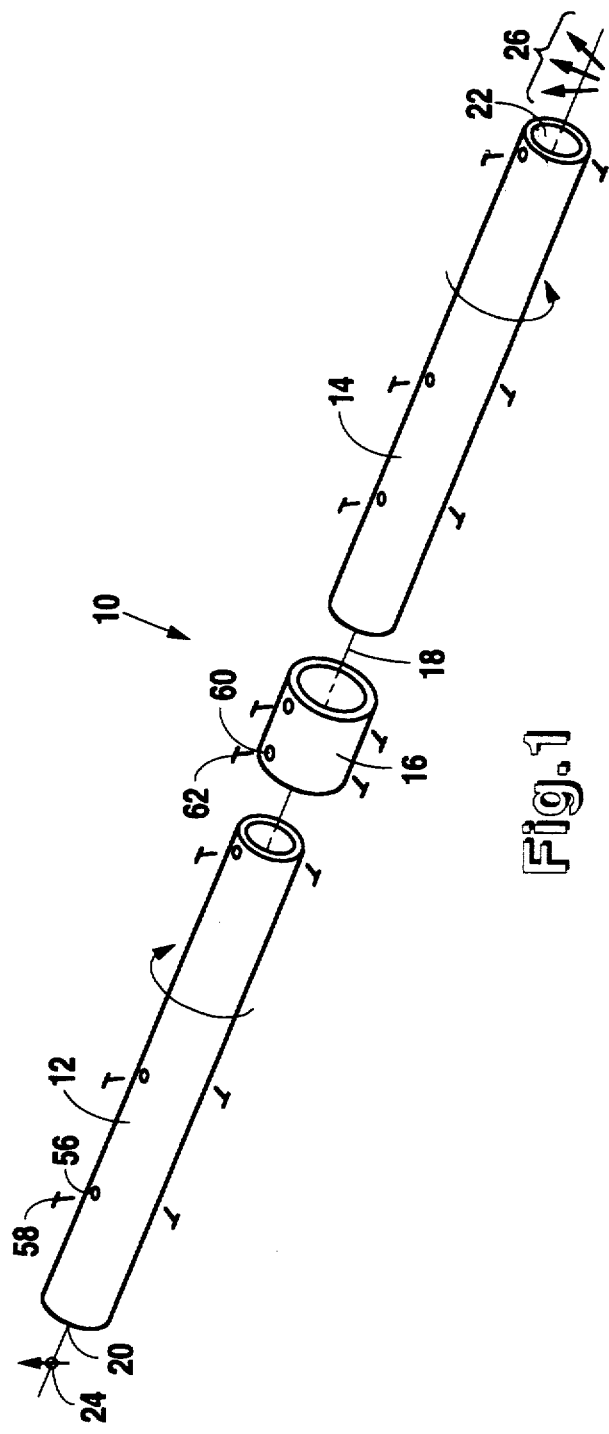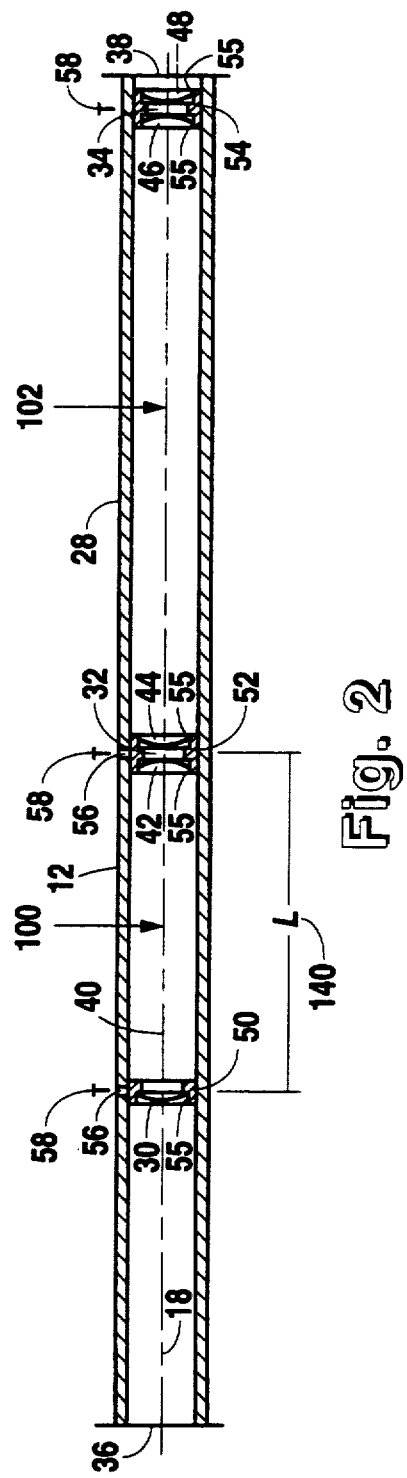

IMAGE ROTATION DEVICE

RELATED APPLICATIONS

This application is a continuation-in-part application of Dr. E. C. George Sudarshan and Dr. Randall G. Hulet, U.S. patent application Ser. No. 08/065,785, issued May, 3, 1993 which will issue as U.S. Pat. No. 5,331,460; and which was a continuation of U.S. patent application Ser. No. 07/772,105, now abandoned, which was filed on Oct. 7, 1991 by Dr. Sudarshan and Dr. Hulet, and amended, allowed and then withdrawn from issue in favor of the continuation application.

BACKGROUND OF THE INVENTION

1. Field of the Invention

This invention relates to the translation and rotation of optical images. More particularly, the invention relates to an image rotation device with infinite depth of field that transmits optical images along an optical axis, selectively rotates the images about the optical axis, and preserves all of the three dimensional characteristics of the images.

2. Description of the Prior Art

Various methods have been employed to rotate images. Most rotation devices disclosed in the prior art utilize prisms or other reflective surfaces to effect the rotation. The primary disadvantage of all prior image rotating devices is that they do not preserve the angular and spatial relationships of all light rays emanating from the object being imaged. Such devices do not preserve all of the three dimensional characteristics of the original object, namely the relative angles of propagation and distances of all rays forming the image. Thus, the need exists for an apparatus that is capable of translating accurate three dimensional images to a distance removed from the object being viewed, capable of preserving the relative angles of propagation and distances of all of the rays forming the image, and capable of selectively modifying the orientation of the image for ease of viewing and observation. What is also needed is an optical rotation device for communication and computing applications that preserves the angular and spatial relationships of all light rays passing therethrough.

SUMMARY OF THE INVENTION

It is therefore an object of the present invention to provide an optical system for producing accurate three dimensional images at a distance removed from the object being observed.

Another object of the present invention is to provide an optical system for producing accurate three dimensional images that can be selectively rotated for ease of viewing and observation.

Yet another object of the present invention is to provide an optical system that produces accurate three dimensional images and which preserves the relative angles of propagation and distances of all rays forming the images.

It is also an object of the invention to provide an optical rotation device for communications and computing applications that preserves the angular and spatial relationships of all light rays passing therethrough.

A further object of the invention is to provide an optical rotation device with infinite depth of field.

According to the present invention, there is provided an optical rotation device for transmitting optical images along an optical axis and selectively rotating the image about the optical axis, while preserving all of the three dimensional characteristics of the image. The optical rotation device consists of two optical elements optically coupled in series, each of which produces an inversion of the image about an axis orthogonal to the optical axis. Rotation of the image by any angle in the plane normal to the optical axis is achieved by rotating the two optical elements relative to one another about the optical axis.

The above objects and other features of the present invention will become fully apparent from the following detailed description of the preferred embodiment in conjunction with the drawing.

BRIEF DESCRIPTION OF THE DRAWING

FIG. 1 is a perspective, partially exploded view of the image rotation device of the present invention.

FIG. 2 is a cross sectional view of the image rotation device of the present invention.

DESCRIPTION OF THE PREFERRED EMBODIMENTS

Figure 3:
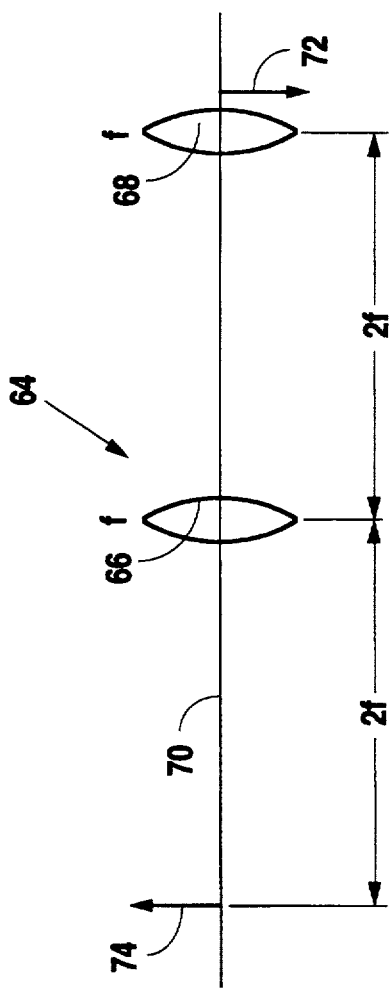
FIG. 3 is a schematic illustration of an inverter.

Reference is now made to the figures, wherein like parts are designated with like numerals throughout.

Referring to FIG. 1, the image rotation device 10 consists of a first optical element 12, a second optical element 14 and a collar 16. As discussed in more detail below, collar 16 is used to optically couple first optical element 12 and second optical element 14 in series. When so coupled, first and second optical elements 12 and 14 share a common optical axis 18. In the device 10 shown in FIG. 1 the optical axis is also the propagation axis along which the light rays propagate. In addition, collar 16 is configured so as to permit first and second optical elements 12 and 14 to be selectively rotated relative to one another about optical axis 18. Device 10 also has an input end 20 and an output end 22. As more fully discussed below, when an object 24 is placed adjacent to input end 20, device 10 translates an accurate, three dimensional image 26 of object 24 to output end 22. The image 26 viewed through output end 22 is a three dimensional image and is identical in all respects to the image of object 24 introduced at input end 20. Furthermore, image 26 can be selectively rotated about optical axis 18 by rotating first and second optical elements 12 and 14 relative to one another.

FIG. 2 shows a cross sectional view of first optical element 12 along the optical axis 18. In FIG. 2 the optical axis and the propagation axis are equivalent. The construction and design of second optical element 14 is identical to first optical element 12. Only the construction and design of first optical element 12 will be described in detail below, it being understood that the components of second optical element 14 are identical in all respects to the corresponding parts of first optical element 12.

First optical element 12 is made up of an elongated cylindrical tube 28, a first cylindrical lens 30, a first doublet 32 and a second doublet 34. Tube 28 measures 4D in length. Tube 28 has an input end 36 and an output end 38. Tube 28 could be made out of any suitable non-transparent material, but in the preferred embodiment, tube 28 is made of black anodized aluminum, and has inside and outside diameters equal to 1 1/16 inches and 1 5/16 inches, respectively.

First cylindrical lens 30 is disposed and rigidly mounted within tube 28 a distance D from input end 36. First cylindrical lens 30 is a plano-convex cylindrical lens with a focal length equal to D/4 and is oriented perpendicular to the optical axis 40 of tube 28 with its convex surface facing input end 36 and its planar surface facing output end 38. First doublet 32 consists of a second cylindrical lens 42 and a first spherical lens 44, which are disposed and rigidly mounted within tube 28 a distance 2D from input end 36. Second Cylindrical lens 42 is a plano-convex cylindrical lens with a focal length equal to D and is oriented perpendicular to longitudinal axis 40 of tube 28 with its planar surface facing input end 36 and its convex surface facing output end 38. First spherical lens 44 is a plano-convex spherical lens with a focal length equal to D and is oriented perpendicular to longitudinal axis 40 of tube 28 with its convex surface facing input end 36 and its planar surface facing output end 38.

Second doublet 34 consists of a third cylindrical lens 46 and a second spherical lens 48, which are disposed and rigidly mounted within tube 28 at output end 38 or a distance 4D from input end 36. Third cylindrical lens 46 is a plano-convex cylindrical lens with a focal length equal to D and is oriented perpendicular to longitudinal axis 40 of tube 28, with its planar surface facing input end 36 and its convex surface facing output end 38. Second spherical lens 48 is a plano-convex spherical lens with a focal length equal to D and is oriented perpendicular to longitudinal axis 40 of tube 28, with its spherical surface facing input end 36 and its planar surface facing output end 38. Lenses 30, 42 and 46 are further oriented such that their cylindrical axes are all parallel and all orthogonal to optical axis 40.

In the preferred embodiment, D is equal to eight inches. Hence, lens 30 has a focal length equal to two inches; lenses 42, 44, 46 and 48 each have focal lengths equal to eight inches; lens 30 is located a distance of eight inches from input end 36; first doublet 32 is located a distance of 16 inches from input end 36; and second doublet 34 is located a distance of 32 inches from input end 36. It should be noted, however, that the specific dimensions given herein are illustrative only, and that changes in the specific dimensions of optical rotation device 10 may be made without departing from the essential characteristics of the invention. In the preferred embodiment, lenses 30, 42, 44, 46 and 48 are also coated with conventional antireflectant material to reduce reflections and attenuation.

Lenses 30, 42, 44, 46 and 48 can be rigidly mounted within tube 28 using any conventional method. In the preferred embodiment, lens holders 50, 52 and 54 are employed. Lenses 30, 42, 44, 46 and 48, which are all one inch in diameter, are cemented at their periphery to their corresponding lens holders, and lens holders 50, 52 and 54 are configured so as to slide into tube 28 with close tolerance. Lens holders 50, 52 and 54 also have annular recesses 55 which receive the edges of lenses 30, 42, 44, 46 and 48 in close tolerance. Tube 28 includes three sets of threaded holes 56, each set radially spaced at 120 degree increments, which receive set screws 58 for securing lens holders 50, 52 and 54 at the appropriate locations within tube 28.

Referring again to FIG. 1, collar 16 is used to optically couple the output end of first optical element 12 to the input end of second optical element 14, although any number of conventional means could be used to couple first and second optical elements 12 and 14 together. In the preferred embodiment, collar 16 is an elongated tube measuring 5 inches in length and having inside and outside diameters equal to 1 5/16 inches and 1 9/16 inches, respectively. Collar 16, which is made of black anodized aluminum, is configured to accept the output end of first optical element 12 and the input end of second optical element 14 in mating relationship. Collar 16 has two sets of threaded holes 60 radially spaced at 120 degree increments, which accept set screws 62 for securing collar 16 to first and second optical elements 12 and 14. By loosening set screws 62, first and second optical elements 12 and 14 can be selectively rotated about optical axis 40 relative to one another.

First and second optical elements 12 and 14 are each formed by combining two fundamental components—an inverter and a translator, each of unit magnification. The optical properties of first and second optical elements 12 and 14 can best be understood by first considering the optical properties of the individual components separately and then in combination.

FIG. 3 illustrates, in schematic fashion, an afocal inverter 64 of unit magnification. Inverter 64 consists of two thin lenses 66 and 68, each having a positive focal length equal to $f$. Lenses 66 and 68, which share a common optical axis 70, are spaced apart a distance equal to $2f$, thereby forming a pair of infinite conjugates of unit magnification.

The characteristics of any optical device can be mathematically expressed in terms of a transfer matrix. See generally E. Hecht, *Optics* at 215-220 (1987). The use of transfer matrices is an analytic method of geometric ray tracing, using the linear (paraxial) approximation. In one dimension, a ray is expressed as a vector whose components are the angle the ray makes with the optical axis and the perpendicular distance of the ray from the axis. A system consisting of thin lenses and free propagation lengths can be expressed as the product of the refraction matrices and transfer matrices associated with the lenses making up the system. The characteristics of inverter 64 can be expressed as follows:

$$\begin{vmatrix} 1 & 0 \\ 2f & 1 \end{vmatrix} \begin{vmatrix} 1 & -1/f \\ 0 & 1 \end{vmatrix} \begin{vmatrix} 1 & 0 \\ 2f & 1 \end{vmatrix} \begin{vmatrix} 1 & -1/f \\ 0 & 1 \end{vmatrix} = - \begin{vmatrix} 1 & 0 \\ 0 & 1 \end{vmatrix}$$

Thus, inverter 64 translates an inverted image 72 of an object 74 by a distance equal to $4f$. Inverter 64 has the unique property that it preserves the relative angles of propagation and positions of all rays passing therethrough, thereby producing an accurate, three dimensional image of objects viewed through inverter 64.

Figure 4:
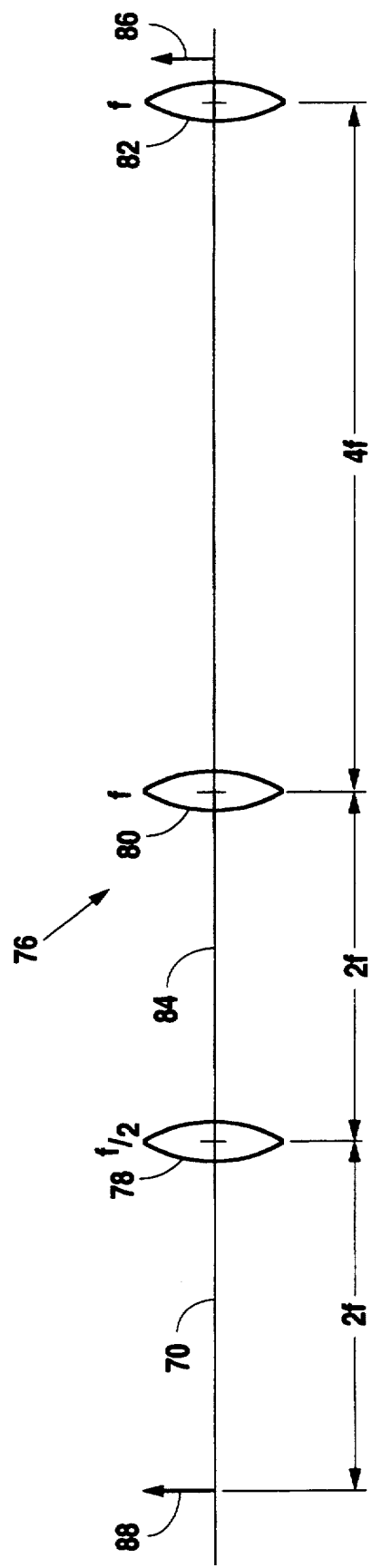
FIG. 4 is a schematic illustration of an optical translator.

FIG. 4 illustrates, in schematic fashion, an afocal translator 76 of unit magnification. Translator 76 consists of three thin lenses 78, 80 and 82. Lens 78 has a positive focal length equal to $f/2$, and lenses 80 and 82 each have positive focal lengths equal to $f$. Lenses 78, 80 and 82 share a common optical axis 84. The distance between lenses 78 and 80 is equal to $2f$, and the distance between lenses 80 and 82 is equal to $4f$. The characteristics of translator 76 can be expressed as follows:

$$\begin{vmatrix} 1 & 0 \\ 2f & 1 \end{vmatrix} \begin{vmatrix} 1 & -2/f \\ 0 & 1 \end{vmatrix} \begin{vmatrix} 1 & 0 \\ 2f & 1 \end{vmatrix} \begin{vmatrix} 1 & -2/f \\ 0 & 1 \end{vmatrix} \begin{vmatrix} 1 & 0 \\ 4f & 1 \end{vmatrix} \begin{vmatrix} 1 & -1/f \\ 0 & 1 \end{vmatrix} = \begin{vmatrix} 1 & 0 \\ 0 & 1 \end{vmatrix}$$

Thus, translator 76 translates an image 86 of an object 88 by a distance equal to $8f$. Translator 76 also preserves the relative angles of propagation and positions of all rays passing therethrough, thereby producing an accurate, three dimensional image of objects viewed through translator 76.

Referring again to FIG. 2, first and second optical elements 12 and 14 each consist of an inverter in combination with a translator. If x,y and z coordinates are taken for FIG. 2 as illustrated at 59, first optical element 12 is oriented such that the cylindrical axes of lenses 30, 42 and 46 are all parallel to the y axis (e.g., perpendicular to the plane of the drawing). Any light ray passing through optical element 12 along propagation axis 40 will have an x-component and a y-component. Because lenses 30, 42 and 46 are cylindrical lenses with their cylindrical axes parallel to the y-axis, the y-component of any ray passing through first optical element 12 will be unaffected by lenses 30, 42 and 46, while the x-component will be refracted by lenses 30, 42 and 46. A comparison of FIGS. 2 and 4 will reveal that the x-component of any ray will be refracted by three lens systems, which are either simple or compound, and which together form a translator that is equivalent to translator 76.

The first lens system acting on the x-component is lens 30 with a focal length equal to D/4. The second lens system is a first doublet 32 consisting of lens 42 and lens 44, each with a focal length equal to D. By simple thin lens relationships, the focal length of the first doublet 32 is D/2. The third lens system is second doublet 34 of focal length D/2, consisting of lenses 46 and 48, each with a focal length D.

In the other direction, the y-component of any ray passing through first optical element 12 will be refracted only by lenses 44 and 48, which form an inverter that is equivalent to inverter 65. Thus, first optical element 12 translates a three dimensional image of an object from its input end to its output end, wherein the translated image is reflected about an axis that is normal to the propagation axis 40. In other words, the image is simply translated with respect to the x-axis, but is inverted with respect to the y-axis.

Device 10 is capable of rotating an image by any angle in the plane normal to the propagation axis 18 by performing two inversion operations about different axes. One inversion operation is performed by first optical element 12 about a first axis lying in a first plane normal to propagation axis 18, and the other inversion operation is performed by second optical element 14 about a second axis lying in a second plane normal to propagation axis 18.

To show that rotation of an image can be accomplished through two sequential inversions about different axes, let A represent an operation (e.g., inversion, rotation, etc.) so that:

$$\begin{vmatrix} x' \\ y' \end{vmatrix} = A \begin{vmatrix} x \\ y \end{vmatrix}$$

One operation that can be performed on vector:

$$\begin{vmatrix} x \\ y \end{vmatrix}$$

is rotation. For rotation in the counter-clockwise direction:

$$A = R = \begin{vmatrix} \cos\Theta & \sin\Theta \\ -\sin\Theta & \cos\Theta \end{vmatrix}$$

Another operation that can be performed on vector:

$$\begin{vmatrix} x \\ y \end{vmatrix}$$

is inversion:

$$A = I = \begin{vmatrix} -1 & 0 \\ 0 & 1 \end{vmatrix}$$

The operation of each of first and second optical elements 12 and 14 in the x-y plane is to reflect about some axis. This operation can be expressed mathematically by first rotating the coordinate system of the first optical element 12 so that it is aligned with the inversion axis, perform the inversion, then rotate back:

$$A_1(\Theta) = R_1^{-1} I R_1 = - \begin{vmatrix} \cos^2\Theta - \sin^2\Theta & 2\cos\Theta\sin\Theta \\ 2\cos\Theta\sin\Theta & -\cos^2\Theta + \sin^2\Theta \end{vmatrix}$$

Where $\Theta$ is the angle between the coordinate system of first optical element 12 and some fixed coordinate system in space. A similar operator can be derived for second optical element 14 as follows:

$$A_2(\alpha) = R_2^{-1} I R_2 = - \begin{vmatrix} \cos^2\alpha - \sin^2\alpha & 2\cos\alpha\sin\alpha \\ 2\cos\alpha\sin\alpha & -\cos^2\alpha + \sin^2\alpha \end{vmatrix}$$

Where $\alpha$ is the angle between the coordinate system of second optical element 14 and the fixed coordinate system. Therefore, the operation of the optical rotation device 10 can be expressed as the product of the operations of first and second optical elements 12 and 14:

$$C(\Theta, \alpha) = A_2(\alpha) A_1(\Theta)$$

After multiplying and simplifying the matrices, the result is found to depend only on the difference angle:

$$\Phi = \Theta - \alpha$$

-continued $$C(\Theta,\alpha) = C(\Phi) = \begin{vmatrix} \cos2\Phi & \sin2\Phi \\ -\sin2\Phi & \cos2\Phi \end{vmatrix}$$

which is simply the rotation matrix. Thus, two inversions about axes that are related by an angle $\Phi$ with respect to each other produces a rotation in the x-y plane by an angle $2\Phi$.

Thus, by selectively rotating first and second optical elements 12 and 14 relative to one another, it is possible to vary the orientation of the axes about which the respective inversion operations are performed. Therefore, physically rotating first and second optical elements 12 and 14 relative to one anther produces a rotation of image 26 as viewed from output end 22. Thus, device 10 produces accurate, three dimensional images of objects viewed therethrough, translates those images from input end 20 to output end 22 a distance equal to 32 inches and enables the images to be reoriented for convenience of viewing and observation. Moreover, device 10 preserves all of the three dimensional characteristics of the image, namely the relative angles of propagation and distances of all rays forming the image.

Another important property of optical rotation device 10 is that it possesses infinite depth of field. This property is a direct result of the fact that optical rotation device 10 preserves the relative angles and directions of all rays within the solid angle subtended by input end 20. In other words, all rays exiting output end 22 bear precisely the same angular and spatial relationship to one another as they did when they entered input end 20. Accordingly, optical rotation device 10 has no focal plane and, therefore, possesses infinite depth of field.

For some applications of the invention, it may be desirable to reduce the overall length of the device. The overall length of the device is determined by the focal length of the lenses used in the optical elements. The focal length of the lenses determines the distance between the lenses, and therefore, the length of the device. The actual length between the lenses and doublets in the first optical element 12 can be decreased by using a third optical component between the lens 30 and the first doublet 32 as shown in FIG. 2 at a general position 100; and/or between the first doublet 32 and the second doublet 34 shown in FIG. 2 at a general position 102. The third component can also be utilized between the lenses and doublets in the second optical element 14.

The function of the third optical component is to fold the light rays and therefore the propagation axis in order to compress the actual length of the device while keeping the effective length of the propagation axis the same.

Figure 5A:
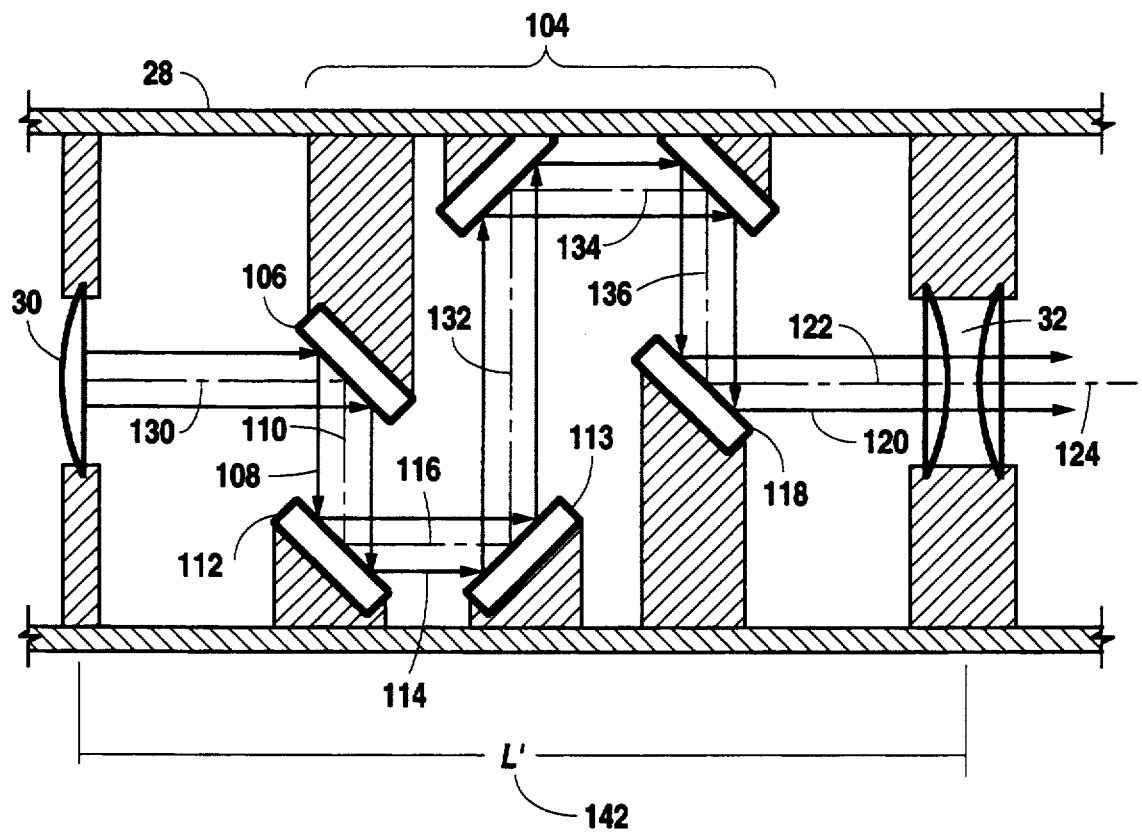
FIG. 5a is cross sectional illustration of a section of the inventive device showing a propagation axis folding component.

FIG. 5a shows a section of the first optical element 12 with a light-ray/propagation-axis folding component 104 which has been positioned between the lens 30 and the first doublet 32. The folding component 104 utilizes a series of rigidly mounted mirrors to fold the light rays and the propagation axis.

The light rays passing through lens 30 propagate to the first mirror 106 which folds the light rays 108 and the propagation axis 110, sending the rays in the direction of a second mirror 112, which folds the light rays 114 and propagation axis 116 in the direction of another mirror, and continues this process until the image reaches the final mirror 118 which folds the light rays 120 and propagation axis 122 mirrors in parallel with the optical axis 124 of the lenses in the doublet 32. The sum of the propagation axes 130, 110, 116, 132, 134, 136 and 122 should be equal to the length of the optical axis l for the segment of the optical element 12, shown in FIG. 2 at 140, within a compressed length l' shown in FIG. 5a at 142. The compressed length l' in FIG. 5a is shorter than the uncompressed length l in FIG. 2 by the sum of the folded propagation axis lengths 110, 132, and 136.

Figure 5B:
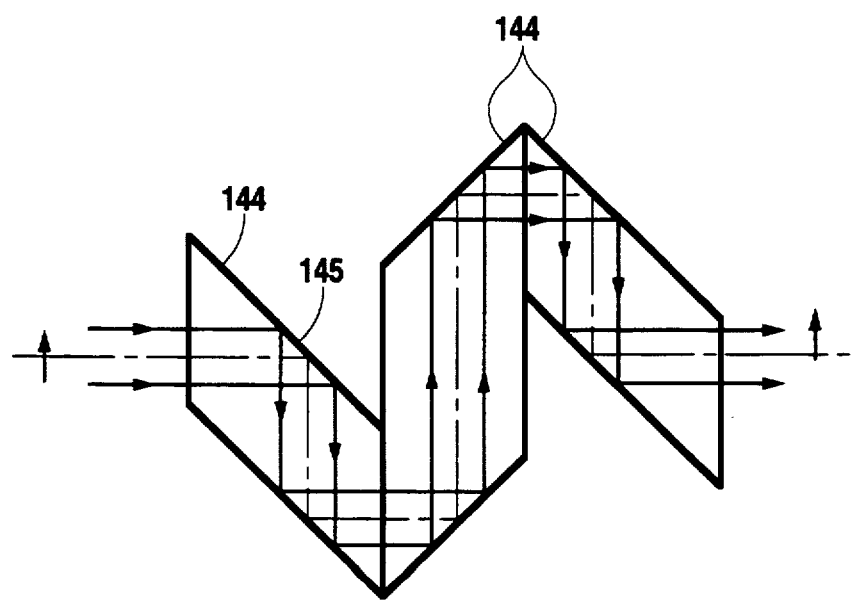
FIG. 5b is a schematic illustration of an alternative propagation axis folding component.

In an alternative embodiment shown in FIG. 5b, the folding device could utilize prisms 144 instead of mirrors. The inner surfaces 145 of the prisms 144 shown in FIG. 5b serve as the reflective surfaces for folding the light rays and propagation axes.

Figure 6:
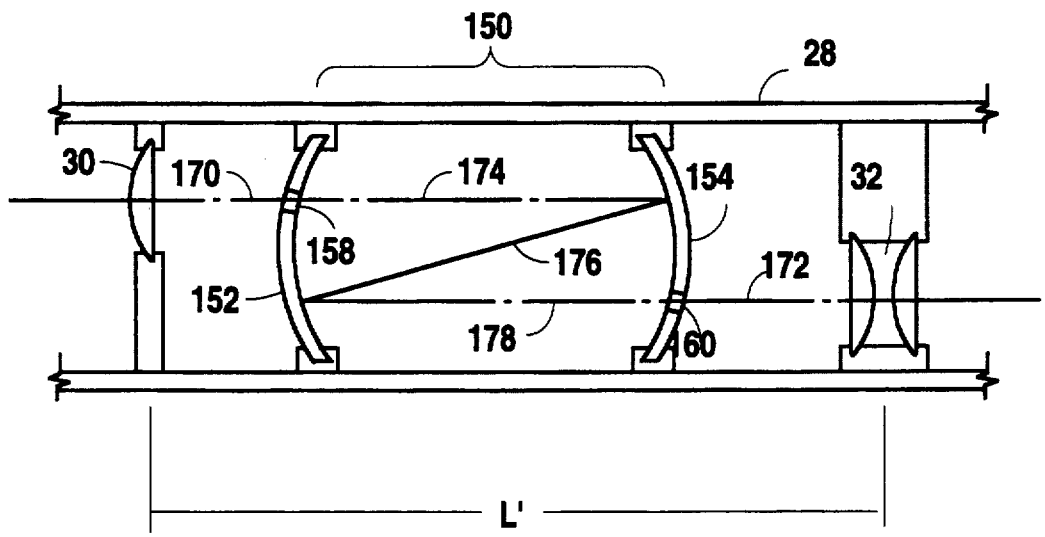
FIG. 6 is a cross sectional illustration of a section of the inventive device showing an alternative embodiment of the propagation axis folding component.

FIGS. 6 illustrates an alternative embodiment of the light-ray/propagation-axis folding component 150 composed of two spherical mirrors 152 and 154 which create a confocal cavity 156. The mirrors 152 and 154 each contain a hole or a plurality of holes 158 and 160 through which light may pass. It is preferable that the holes be smaller than one-half ($\frac{1}{2}$) the diameter of the mirrors.

Figure 7:
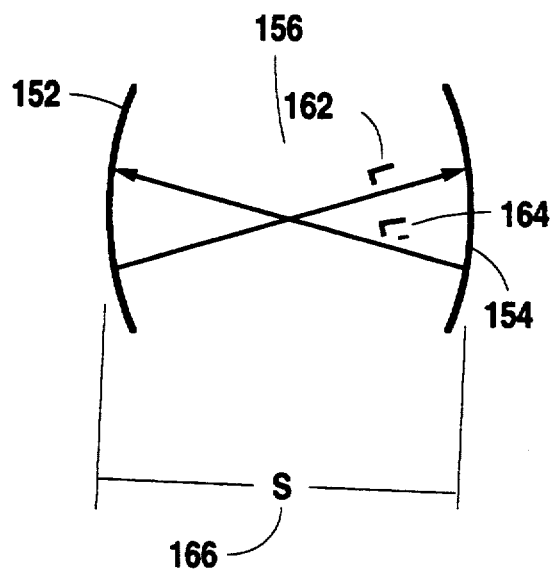
FIG. 7 is a schematic illustration of the geometric configuration of the embodiment of the propagation axis folding component shown in FIG. 6.

The geometric configuration of the light-ray/propagation-axis folding component 150 is shown in FIG. 7. The radius of curvature r 162 and r' 164 of mirrors 154 and 152 respectively are both equal to the separation distance s 166 defining the confocal cavity 156. The matrix equation expression for a round trip pass in the cavity, assuming the light rays are paraxial, is:

$$\begin{vmatrix} 1 & 0 \\ -2/r & 1 \end{vmatrix} \begin{vmatrix} 1 & s \\ 0 & 1 \end{vmatrix} \begin{vmatrix} 1 & 0 \\ -2/r & 1 \end{vmatrix} \begin{vmatrix} 1 & s \\ 0 & 1 \end{vmatrix} = \begin{vmatrix} -1 & 0 \\ 0 & -1 \end{vmatrix}$$

Therefore y and $\Theta$ at the input end 170 of the propagation axis folding component 150 are converted to y' and $\Theta'$ at the output end 172 as follows:

$$y' = -y$$

$$\Theta' = -\Theta$$

In FIG. 6 the light-rays passing through lens 30 propagate in the direction of and pass through the hole(s) 158 in mirror 152 and continue to propagate in the direction of mirror 154 where they are folded back in the direction of mirror 152. Mirror 152 then folds the light-rays in the direction of the hole(s) 162 in mirror 154 where they pass and propagate along the optical axis of doublet 32. As a result, the net distance between the lens 30 and doublet 32 can be compressed by a length equal to the length of the folded propagation axis 174 and 178 while the effective propagation length between lens 30 and doublet 32 remains the same as the length l in FIG. 2.

Figure 8A:
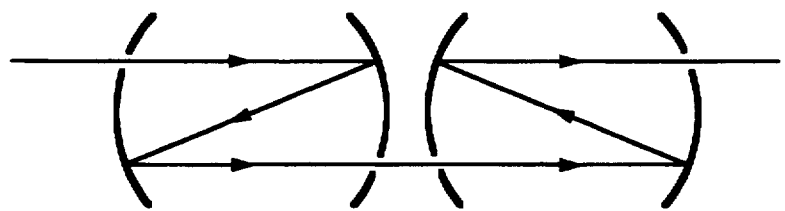
FIG. 8a is a schematic illustration of an alternative configuration of the propagation axis folding component shown in FIG. 6.
Figure 8B:
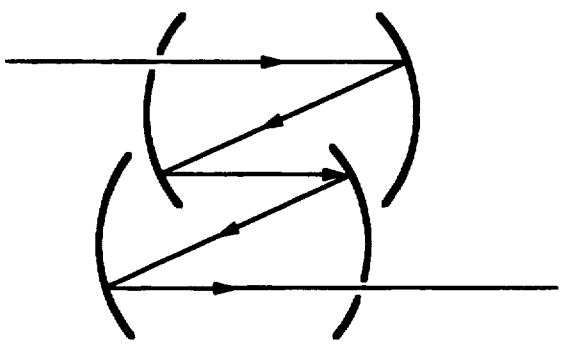
FIG. 8b is a schematic illustration of an alternative configuration of the propagation axis folding component shown in FIG. 6.
Figure 8C:
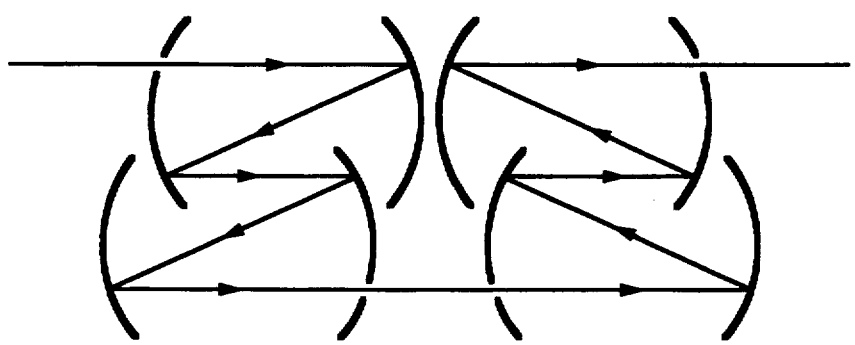
FIG. 8c is a schematic illustration of an alternative configuration of the propagation axis folding component shown in FIG. 6.

FIG. 6 is an illustration and is by no means to scale. Furthermore, FIGS. 6 and 7 show the use of a single confocal cavity to fold the propagation axis and therefore compress the length needed between lenses 30 and doublets 32 and 34 in the device 10. Additional compression can be obtained by using confocal cavities in series as illustrated in FIG. 8a, stacked as shown in FIG. 8b, or in some combination of the two as shown in FIG. 8c.

In an alternative embodiment, not shown, the spherical mirrors can be offset so that the cavity in which the propagation axis is folded is not confocal. However such a configuration will cause some loss of the three dimensional aspects of the output image.

The use of confocal cavities is also preferable to the use of flat mirrors or prisms because they do not degrade the three dimensional aspects of the image at the output end of the device. There is some degradation of the three dimensional aspects of the image using flat mirrors. Nevertheless for certain applications the use of flat mirrors or prisms to compress the length of the device may be more suitable.

The foregoing discussion has concentrated on the use of optical rotation device 10 for three dimensional imaging applications. Device 10 may also be used in any other application requiring translation and/or rotation of light rays where the preservation of the angular and spatial relationship between the various light rays is important. For example, device 10 could be used in optical communication networks to transmit and selectively rotate the orientation of one or more beams of light. Similarly, device 10 could be used in other optical applications such as optical computing and the like. Regardless of the applications, the principles and characteristics of device 10 discussed herein would hold true.

The invention may be embodied in other specific forms without departing from its spirit or essential characteristics. The described embodiment is to be considered in all respects only as illustrative and not restrictive, and the scope of the invention is, therefore, indicated by the appended claims rather than the foregoing description. All changes that come within the meaning and range of equivalency of the claims are embraced within their scope.

We claim:

1. An optical device for simultaneously inverting and translating a three dimensional image of an object along a propagation axis, wherein the light rays that make up the three dimensional image have x, y, and z components wherein further the x and y components are normal to the propagation axis and the z component is parallel to the propagation axis, comprising:
   a) a translator which translates the x and y components of the light rays of the image along the propagation axis;
   b) an inverter which inverts the image, refracting the x component of the light rays of the image while leaving the y component unaffected;
   wherein the translator and inverter are coupled so that the image is simultaneously translated and inverted so that all rays exiting the device bear the same angular and spatial relationship to one another as they did as they entered the device.

2. The optical device in claim 1, wherein:
   a) the translator is comprised of a set of lenses; and
   b) the inverter is comprised of a set of lenses.

3. The optical device in claim 2, which further comprises:
   a propagation axis folding component positioned between the lenses whereby the physical length of the device can be shorter than the length of the propagation axis.

4. The optical device of claim 2 with an input and output end, wherein:
   a) the inverter set of lenses further comprises first and second plano-convex spherical lenses; and
   b) the translator set of lenses further comprises first, second and third plano-convex cylindrical lenses.

5. The optical device in claim 4, wherein:
   a) the convex side of the inverter lenses face the input end of the device; and
   b) the convex side of the translator lenses face the output end of the device.

6. The optical device in claim 5, wherein:
   a) the first translator lens has a focal length equal to D/4 and the second and third translator lenses have a focal length of D;
   b) The first and second inverter lenses have a focal length of D;
   c) the first translator lens is located an equivalent propagation axis length D from the input end of the device;
   d) the second translator lens and the first inverter lens are coupled and located an equivalent propagation axis length 2D from the input end of the device; and
   e) the third translator lens and the second inverter lens are coupled and located an equivalent propagation axis length 4D from the input end of the device.

7. The optical device of claim 3 with an input and output end, wherein:
   a) the inverter set of lenses further comprises first and second plano-convex spherical lenses; and
   b) the translator set of lenses further comprises first, second and third plano-convex cylindrical lenses.

8. The optical device in claim 7, wherein:
   a) the convex side of the inverter lenses face the input end of the device; and
   b) the convex side of the translator lenses face the output end of the device.

9. The optical device in claim 8, wherein:
   a) the first translator lens has a focal length equal to D/4 and the second and third translator lenses have a focal length of D;
   b) The first and second inverter lenses have a focal length of D;
   c) the first translator lens is located an equivalent propagation axis length D from the input end of the device;
   d) the second translator lens and the first inverter lens are coupled and located an equivalent propagation axis length 2D from the input end of the device; and
   e) the third translator lens and the second inverter lens are coupled and located an equivalent propagation axis length 4D from the input end of the device.

10. An image rotation device for translating a three dimensional image of an object along, and selectively rotating the image about an optical axis, comprising:
   a) a first and second optical element which each simultaneously invert and translate a three dimensional image of an object along a propagation axis, wherein the light rays that make up the three dimensional image have x, y, and z components wherein further the x and y components are normal to the propagation axis and the z component is parallel to the propagation axis, comprising:
      i) a translator which translates the x and y components of the light rays of the image along the propagation axis;
      ii) an inverter which inverts the image, refracting the x component of the light rays of the image while leaving the y component unaffected;
      wherein the translator and inverter are coupled so that the image is simultaneously translated and inverted so that all rays exiting the device bear the same angular and spatial relationship to one another as they did as they entered the device;

b) means for optically coupling the first and second optical elements in series;

c) means for selectively rotating the first and second optical elements relative to one another about an optical axis;

whereby the output image can be selectively rotated about the optical axis.

11. The optical device in claim 10, wherein, for each optical element:

a) the translator is comprised of a set of lenses; and b) the inverter is comprised of a set of lenses.

12. The image rotation device in claim 11, which further comprises:

a propagation axis folding component positioned between the lenses whereby the physical length of the device can be shorter than the length of the propagation axis.

13. The image rotation device of claim 11 with an input and output end, wherein, for each optical element:

a) the inverter set of lenses further comprises first and second plano-convex spherical lenses; and b) the translator set of lenses further comprises first, second and third plano-convex cylindrical lenses.

14. The device in claim 13, wherein, for each optical element:

a) the convex side of the inverter lenses face the input end of the device; and b) the convex side of the translator lenses face the output end of the device.

15. The device in claim 14, wherein, for each optical element:

a) the first translator lens has a focal length equal to D/4 and the second and third translator lenses have a focal length of D;

b) The first and second inverter lenses have a focal length of D;

c) the first translator lens is located an equivalent propagation axis length D from the input end of the optical element;

d) the second translator lens and the first inverter lens are coupled and located an equivalent propagation axis length 2D from the input end of the optical element; and e) the third translator lens and the second inverter lens are coupled and located an equivalent propagation axis length 4D from the input end of the optical element.

16. The image rotation device of claim 12 with an input and output end, wherein, for each optical element:

a) the inverter set of lenses further comprises first and second plano-convex spherical lenses; and b) the translator set of lenses further comprises first, second and third plano-convex cylindrical lenses.

17. The device in claim 16, wherein, for each optical element:

a) the convex side of the inverter lenses face the input end of the device; and b) the convex side of the translator lenses face the output end of the device.

18. The device in claim 16, wherein, for each optical element:

a) the first translator lens has a focal length equal to D/4 and the second and third translator lenses have a focal length of D;

b) The first and second inverter lenses have a focal length of D;

c) the first translator lens is located an equivalent propagation axis length D from the input end of the optical element;

d) the second translator lens and the first inverter lens are coupled and located an equivalent propagation axis length 2D from the input end of the optical element; and e) the third translator lens and the second inverter lens are coupled and located an equivalent propagation axis length 4D from the input end of the optical element.

19. An afocal image rotation device for translating a three dimensional image of an object along a propagation axis and selectively rotating the image about, an optical axis comprising:

a) means for inverting the image about a first axis normal to the optical axis;

b) means for inverting the image about a second axis normal to the optical axis;

c) means for folding the propagation axis to shorten the physical length of the first and second inverting means;

d) means for optically coupling the first inverting means and the second inverting means in series along the optical axis; and e) means for selectively rotating the first and second inverting means relative to one another about the optical axis;

wherein all rays exiting the device bear the same angular and spatial relationship to one another as they did as they entered the device.

* * * * *